United States Patent [19]

McClaskey et al.

[11] 3,949,296
[45] Apr. 6, 1976

[54] CODE AND GENERATING MEANS FOR AVIONICS COMMUNCIATION SYNTHESIZER

[75] Inventors: Boyd M. McClaskey, Flourtown; John F. Smith, Warminster, both of Pa.

[73] Assignee: Narco Scientific Industries, Inc., Fort Washington, Pa.

[22] Filed: Jan. 23, 1975

[21] Appl. No.: 543,540

[52] U.S. Cl. .................. 325/17; 325/184; 325/421; 331/1 A
[51] Int. Cl.² .......................................... H04B 1/38
[58] Field of Search ........ 325/17, 25, 416, 418–422; 307/216, 221 R, 226 R; 328/30, 37, 39, 41, 45, 46, 48

[56] References Cited
UNITED STATES PATENTS

| | | | |
|---|---|---|---|
| 3,673,501 | 6/1972 | Zeph | 328/37 |
| 3,725,791 | 4/1973 | Moreau et al. | 328/48 X |
| 3,777,278 | 12/1973 | Majeau et al. | 328/37 X |
| 3,863,224 | 1/1975 | Alexander | 328/37 X |

*Primary Examiner*—Benedict V. Safourek
*Attorney, Agent, or Firm*—Paul & Paul

[57] ABSTRACT

For use in a channel synthesizer utilizing a pulse swallowing phase locked loop, an eight bit code represents the megahertz component of the selected channel. An eight stage shift register is preloaded with the coded version of the selected megahertz component, and exclusive OR logic responsive selectively to the first, third, fifth, and eighth stages generates data for the first stage during the next shift. NAND logic responsive to the various stages detects presence of certain code combinations which are representative of terminal count states. Each terminal count pulse is utilized for comparison with the frequency reference in the phase locked loop, and also in a feedback arrangement to reset the registers to their preloaded states.

4 Claims, 2 Drawing Figures

CODE AND GENERATING MEANS FOR AVIONICS COMMUNCIATIONS SYNTHESIZER

BACKGROUND OF THE INVENTION

This invention relates to code generators, and more particularly to codes and generators therefor applicable to counting circuitry in avionics channel synthesizers.

In a U.S. Pat. application of Boyd McClaskey and John Smith entitled "Improved Digital Synthesizer," filed concurrently herewith and assigned to the assignee hereof, Ser. No. 543,538, there is described an avionics communication channel synthesizer utilizing a digital phase locked loop employing "pulse swallowing" techniques. In accordance with the scheme set forth therein, a pulse signal from a voltage controlled oscillator is alternately divided by 40 or 41 in response to the fractional MHz component of the channel selected for communication. Thereafter, it is specified, a MHz counter, preset in accordance with the MHz component of the selected channel, further divides the pulse signals by the MHz component (i.e., 118 through 147 MHz including channels allocated to transmit and receive modes), and couples the output signal to a phase/frequency detector for comparison with a reference signal.

In an application of Boyd M. McClaskey filed concurrently herewith and assigned to the assignee hereof, entitled "Fractional Megahertz Counter for Improved Digital Synthesizer" S.N. 543,539, there is set forth a logic scheme and code whereby, in response to the fractional MHz component of the selected channel, the alternate divide by 40/41 counters in the phase locked loop are operated.

In a patent to William M. Wisser, et al., entitled "Avionics Channel Selection Apparatus," Ser. No. 3,879,692 issued Apr. 22, 1975 and assigned to the assignee hereof, there is set forth apparatus whereby the designation of the selected channel is translated into the positioning of rotary wafer switches configured in accordance with predetermined codes.

An aspect not dealt with in detail in the foregoing co-pending applications relates to advantageous embodiment of the MHz counter. Since transmit channels are arrayed between 118 and 135.975 MHz, and receive channels are respectively located 12 MHz above their corresponding transmit channel, an 8 bit code is required to represent the counting process which is between 118 and 147 increments long, depending on the MHz component of the selected channel. The decoding must be carefully selected, however, to correct problems such as the "persistent ones" problem, should they occur. That is, if transmission errors occur whereby the register erroneously contains all logical one signals, it is desirable that the situation be detected and corrected, lest the ones serve to "jam" the counter logic such that no further data would be available to shift through the register. Hence, it is a primary object of the present invention to provide a coding arrangement which avoids the "persistent ones" problem, and a counter including circuitry which generates the specified code.

Furthermore, it is an object that the coding arrangement, and circuitry embodying it, should employ code allocations to the MHz components themselves whereby the rotary wafer switch arrangement set forth in the above captioned patent application of Wisser, et al., conveniently may be utilized to initiate each MHz counting cycle. Finally, after the requisite number of counts, it is desirable that the code entries allocated to the respective receive or transmit modes be detectable by reasonably compact and simple logic, yet be relatively compatible with one another.

Finally, it is an object that all logical apparatus be relatively simple and straightforward in design to minimize quality control and fault detection problems.

SUMMARY OF THE INVENTION

The present invention relates to a specific code, which conveniently meets the foregoing objectives, and logical circuitry for generating it. The embodiments avoid the "persistent ones" problem; moreover, the code is conveniently embodied by relatively simple logic and includes terminal states which are conveniently sensed by NAND logic.

In an illustrative embodiment, an eight stage shift register is preloaded from a rotary wafer switch, configured in accordance with the code, to commence shifting at the coded representation of the MHz component of the selected channel. A first exclusive OR gate is responsive to the second and third stages, a second exclusive OR gate is responsive to the fifth and eighth stages, and a third exclusive OR gate is responsive to the first and second gates. The output of the third exclusive OR gate is inverted and coupled back to the first stage of the register, the shifting of which is clocked by pulses from the divide by 40/41 counter. A first NAND gate is responsive to the former four stages and the inverted output of the eighth stage of the register, a second is responsive to the latter four stages, and together with an exclusive OR gate the two generate divided pulses for comparison with the reference, which also reset the register to the preloaded code.

DETAILED DESCRIPTION

Figure 1:
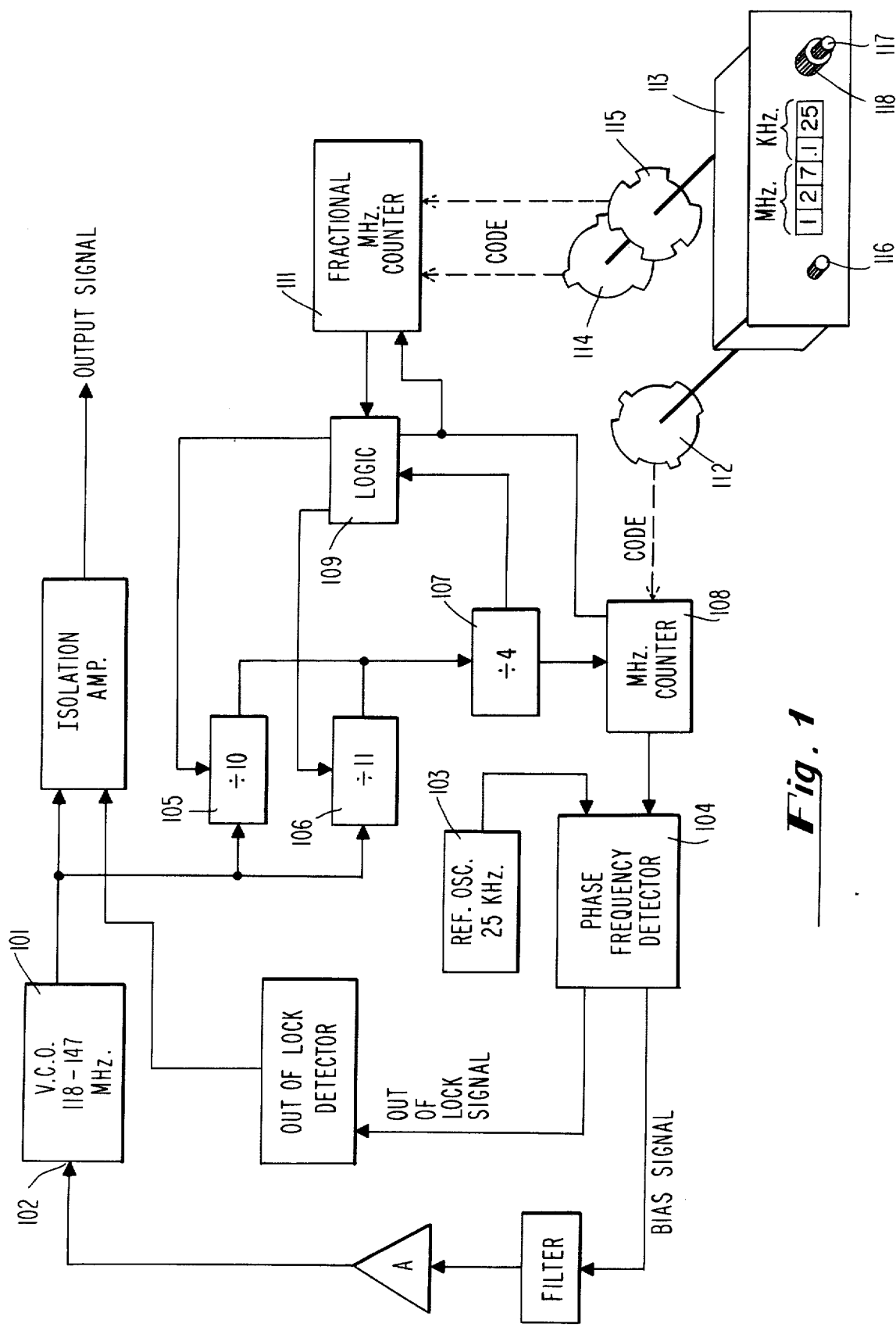
FIG. 1 shows in block diagrammatic form a digital synthesizer employing pulse swallowing techniques, which is amenable to application of the principles of the present invention.

In FIG. 1, there is shown a block diagram of a digital synthesizer utilizing multiple mode pulse division (i.e., "pulse swallowing") circuitry. In particular, the embodiment of FIG. 1 includes a phase locked loop such as is described and claimed in the first aforementioned concurrently filed application of Boyd McClaskey and John Smith. A voltage controlled oscillator 101 generates signals having a frequency between 118 and 147.975 MHz, in response to a voltage presented at a control terminal 102. The pulse signal produced by the voltage controlled oscillator is variously divided and is compared with a 25 KHz reference signal from an oscillator 103 at a phase/frequency detector 104. Phase and frequency disparity sensed by the phase detector 104 is translated into a bias signal, which when filtered and amplified is presented to the control terminal 102 of the voltage controlled oscillator 101.

The embodiment of FIG. 1 is designed to operate for avionics communication, and thereby employs respective channels of 25 KHz bandwidth dispersed continuously through the requisite MHz band. For transmission, 720 such channels are spaced between 118 and 135.975 MHz, and for receive mode communication, 720 channels are dispersed between 130 and 147.975 MHz. Selection of a given transmit channel, such as for example 126.625, thereby establishes that reception will occur on a corresponding channel 12 MHz higher in frequency, i.e., 138.625 MHz. In the FIG. 1 embodiment, because no even division factor is available conveniently to reduce the output of the voltage controlled oscillator 101 to a 25 KHz signal for comparison, an alternate frequency division scheme is established, whereby the signals are alternately divided by 40 or 41. That is, they are first divided either by a factor of 10 at pulse counter 105, or by a factor of 11, at pulse counter 106, prior to division by 4 at pulse counter 107. Thereafter, they are divided by prevailing MHz increment at pulse counter 108.

As also set forth, the MHz counter is preset in response to a coded signal from a rotary switch 112, the position of which is set by a MHz control knob 116 of a mechnical channel selection apparatus 113. Presetting the MHz counter 108 to the MHz component of the selected channel effectively sets the counting cycle of the counter 108, and establishes a periodicity for the fractional MHz counter 111 and its attendant logic 109. It is the cooperative functioning of the MHz counter 108 with code selection apparatus 112, divide by 4 counter 107, fractional MHz counter 111 and attendant logic 109, and phase detector 104 which forms the basis for the principles of the present invention.

The design constraints upon the code embodying the principles of the present invention include adequate provision for readily detectable terminal counts for the transmit and receive mode, and code allocations to the MHz components themselves such that the rotary switch presetting apparatus may be utilized. An eight bit code which meets these conditions is as follows. Representing the outputs of the eight stages as an eight bit binary number, the transmit terminal state is defined as "11110000" and the receive terminal state as "11101111". Allocation of eight bit codes to the MHz component of the respective transmit and receive conditions is as follows:

| Freq (MHz) TRANS | RECEIVE | Stages 1 Through 8 |
|---|---|---|
| 135 | 147 | 00010111 |
| 134 | 146 | 00001011 |
| 133 | 145 | 10000101 |
| 132 | 144 | 11000010 |
| 131 | 143 | 01100001 |
| 130 | 142 | 10110000 |
| 129 | 141 | 11011000 |
| 128 | 140 | 11101100 |
| 127 | 139 | 01110110 |
| 126 | 138 | 00111011 |
| 125 | 137 | 00011101 |
| 124 | 136 | 10001110 |
| 123 | 135 | 11000111 |
| 122 | 134 | 11100011 |
| 121 | 133 | 01110001 |
| 120 | 132 | 10111000 |
| 119 | 131 | 01011100 |
| 118 | 130 | 00101110 |

Figure 2:
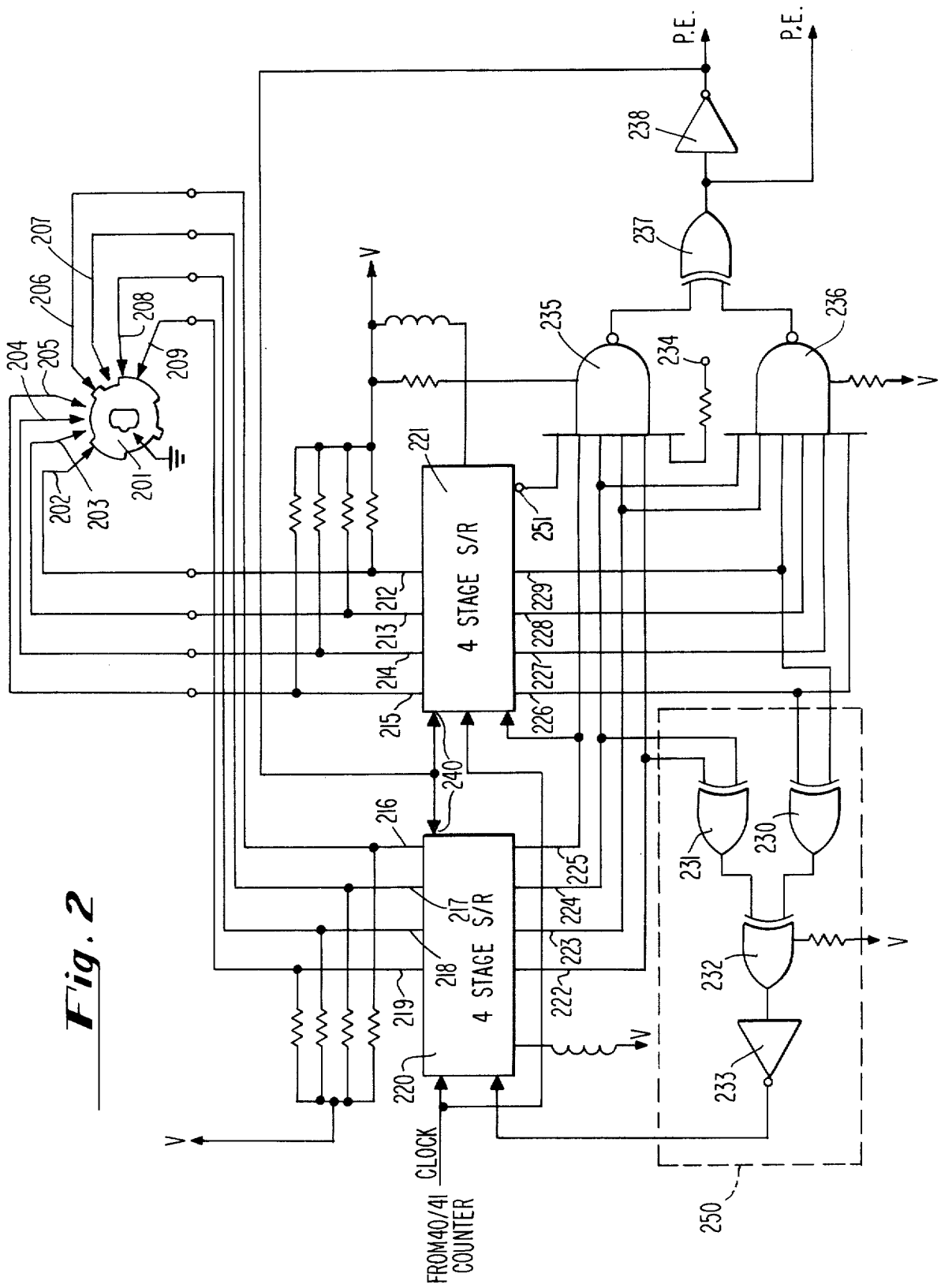
FIG. 2 shows a schematic diagram of logic circuitry which generates the desired code and which serves as a MHz counter for the embodiment of FIG. 1.

The above table depicts a code whereby shifting occurs from left to right, proceeding downwardly in MHz frequency increments, with the first digit being reloaded in each case in accordance with the logical circuitry of FIG. 2. Between the lower most frequency shown (118 and 130 MHz for transmit and receive, respectively), the same operation continues for that number of shifts until the corresponding transmit or receive terminal states are achieved. Hence, if transmission is occuring on, for example, 127 MHz, and reception is therefore occuring on 139 MHz, the logical counters are to be preloaded with "01110110," and counting proceeds from there. For the first increment, the first seven digits are shifted to the right, the last logical 0 is lost, and a new logical 0 is inserted at the first place in accordance with the operative logic circuitry, thereby producing logic states of "00111011." Thereafter, the next shift occurs, yielding "00011101," and so on. If the synthesizer is in the transmit mode, a resetting operation will occur 126 increments later, when "11110000" occurs, and if it is in the receive state, counting will continue through 138 increments, and resetting at receive terminal state of "11101111."

Logical apparatus which embodies the foregoing code is set forth in FIG. 2. A rotary wafer switch 201, which is maintained at ground potential, has eight brush contacts 202 through 209 arrayed at its periphery. The shape of the switch 201 conforms to the foregoing code, such that each position thereof connects select ones of the contacts 202 through 209 with ground potential. The terminals which do not make contact with the switch 201 are maintained at a positive potential through biasing resistors as shown. The position shown for the switch 201 yields a logical state of "00101110," reading from terminals 209 through 202, which is seen from the foregoing table to represent 118 MHz for transmit and 130 MHz for receive. The logical states of terminals 202 through 209 are coupled to eight input terminals 212 through 219 of an eight bit shift register. The register is represented in FIG. 2 as two blocks 220 and 221, each of which symbolically represents four stages. The blocks 220 and 221, as shown, represent Fairchild 9300 Integrated Circuit Modules, which are available commerically. It is apparent of course, that the registers 220 and 210 may be otherwise embodied by such apparatus as is conveniently available. Hereinafter, the stages shown as 220 are designated first through fourth, respectively, from left to right, and the four stages of block 221 are designated fifth through eighth, respectively. Accordingly, the first stage has an input terminal 219 and an output terminal 222, the second an input terminal 218 and an output terminal 223, the third an input terminal 217 and an output terminal 224, the fourth an input 216 and an output 225, and so on. Data is read into the first stage via a terminal 239, and shifting occurs when an energizing pulse is received at clock terminals which are connected to the 40/41 counter of the loop. The code as set forth above is generated by sensing appropriate ones of the stages, producing a signal, and feeding it back to the data input 239. This occurs at a shift register feedback gate generally set forth as 250. In particular, the feedback gate 250 includes a first exclusive OR gate 231 which is responsive to the output terminals 222 and 224, respectively, of the first and third stages of the register. A second exclusive OR gate 230 is responsive to the output terminals 226 and 229 of the fifth and eighth stages of the register, respectively. A third exclusive OR gate 232, is responsive to the first two gates 230 and 231, and the output of the third gate 232 is inverted at 233 and coupled back to the data input 239 of the first stage. As is known, exclusive OR gates produce a logical 1 output if a pulse appears at either input terminal, but if no pulse appears at the inputs, or if pulses appear at both inputs, a logical 0 output results. Thus, it may be seen that the feedback gate 250, including exclusive OR gates 230, 231, 232 and inverter 233 generates the shifting code set forth in the above table. Each clock pulse from the 40/41 counter causes the logical signal at data terminal 239 to be sampled and read into the first gate, and the data at each of the first through seventh gates to be transferred to the next sequential stage.

Whether or not the apparatus is in the transmit or receive mode is established at terminal 234, which in turn is coupled to mode selection circuitry. If terminal 234 is in a logical 1 condition, a transmit mode state is established, and if terminal 234 is in a logical 0 condition, a receive mode state is established. Terminal 234 is coupled to a NAND gate 235, which is also responsive to the four outputs 222 through 225 of the first four stages of the register 220 and to the inverted output 251 of the eighth stage. Inasmuch as the transmit terminal state is defined as "11110000," and, in the code allocations, no other increment involves four logical 1's in the first four stages and a logical zero (i.e., inverted to a logical 1) in the eighth, NAND gate 235 senses the transmit terminal state, and produces a logical 0 at its output when that condition occurs. Another NAND gate 236 is responsive to the second, third, and fifth through eighth stages, and thereby serves to identify the receive terminal state, "11101111." It may be noted that NAND gate 236 could also be made responsive to the output terminal 222 of the first stage, but in view of the code selections, that connection is redundant. Hence, NAND gate 236 produces a logical 0 at its output whenever the receive terminal state occurs. The gates 235 and 236 each are coupled to an exclusive OR gate 237, which thereby represents at its output whether the terminal count has been achieved, or whether the counting process is proceeding. That is, the output of exclusive OR gate 237 is a logical 1 whenever the counting occurs, but becomes a logical 0 whenever the terminal count is achieved, whether the apparatus is in transmit or receive mode. For the other apparatus, this signal is represented as $\overline{PE}$, which when inverted at 238 yields the terminal count pulse, PE. This pulse is utilized not only for comparison in the loop with the reference, but also is fed back to reset terminals 240 of the register 220 and 221, thereby causing the preloaded logical states from the switch 201 to be reset in the eight register stages.

The above embodiment, together with an entire synthesizer functionally cooperative therewith, is set forth in detail in a manual published by and available from the assignee hereof, Narco Avionics of Fort Washington, Pennsylvania, entitled "Narco Avionics 720 Channel Spectrum Line, Com IIB Com IIIB tso." The foregoing is submitted as illustrative of the principles of the present invention, but it will be apparent that numerous alternative embodiments will occur to those of ordinary skill in the art without departing from the spirit or the scope thereof.

We claim:

1. In an avionics transceiver having transmission channels arrayed in the frequency range 118 through 135 MHz and respectively corresponding reception channels arrayed in the frequency range 130 through 147MHz, pulse frequency division apparatus operable in accordance with the MHz components of a selected transmit-receive channel pair comprising:

a shift register having eight sequentially connected stages, the pulse signal to be divided clocking shifts of said register;

a first exclusive OR gate responsive to the output states of the first and third ones of said stages;

a second exlusive OR gate responsive to the output states of the fifth and eighth ones of said stages;

a third exclusive OR gate responsive to said first and second gates;

means for inverting the logical output signal of said third gate, and for applying the inverted logical signal to the input of the first of said stages in clocked relationship with the shifting of data between successive sequential stages;

means for presetting the output states of each of said stages of said register in accordance with the selected transmit-receive channel pair as follows

| TRANS | RECEIVE | STAGES 1 through 8 |
|-------|---------|---------------------|
| 135 | 147 | 00010111 |
| 134 | 146 | 00001011 |
| 133 | 145 | 10000101 |
| 132 | 144 | 11000010 |
| 131 | 143 | 01100001 |
| 130 | 142 | 10110000 |
| 129 | 141 | 11011000 |
| 128 | 140 | 11101100 |
| 127 | 139 | 01110110 |
| 126 | 138 | 00111011 |
| 125 | 137 | 00011101 |
| 124 | 136 | 10001110 |
| 123 | 135 | 11000111 |
| 122 | 134 | 11100011 |
| 121 | 133 | 01110001 |
| 120 | 132 | 10111000 |
| 119 | 131 | 01011100 |
| 118 | 130 | 00101110; | and means for producing an output pulse upon occurrence of logical states in said register of 11110000 for transmission and 11101111 for reception.

2. Apparatus as described in claim 1 wherein means for producing includes:

a first NAND gate responsive to the outputs of the first four of said stages and to the inverted output of the eighth of said stages;

a second NAND gate responsive to the outputs of the second, third, and fifth through eighth of said stages;

a fourth exclusive OR gate responsive to said NAND gates; and an inverter for producing a signal for energizing resetting by inverting the output of said fourth exclusive OR gate.

3. Apparatus as described in claim 2 wherein said means for presetting comprises rotatable wafer switch means configured in accordance with said preset code allocations for said transmit-receive channel pairs, and eight contacts spaced in proximity with said wafer switch means, each of said contacts being coupled to a different one of said stages.

4. Apparatus as described in claim 1, adapted to alternate transmit and receive operations of said transceiver, wherein transmit channels are allocated at 25 KHz. increments between 118 and 136 MHz, and receive channels are allocated to correspond respectively to each transmit channel, but are each 12 MHz. higher in frequency.

* * * * *